US009897333B2

United States Patent
Ru et al.

(10) Patent No.: US 9,897,333 B2
(45) Date of Patent: Feb. 20, 2018

(54) WATER HEATER HAVING A WATERWAY CHANGEOVER CONTROL APPARATUS AND METHOD FOR OPERATING THE SAME

(71) Applicant: A. O. Smith Corporation, Milwaukee, WI (US)

(72) Inventors: Xingpeng Ru, Nanjing (CN); Dongwei Zhu, Nanjing (CN); Xiaorong Shao, Nanjing (CN); Jian Xu, Nanjing (CN); Yinan Yang, Nanjing (CN); Zhi Li, Nanjing (CN)

(73) Assignee: A. O. Smith Corporation, Milwaukee, WI (US)

( * ) Notice: Subject to any disclaimer, the term of this patent is extended or adjusted under 35 U.S.C. 154(b) by 214 days.

(21) Appl. No.: 14/844,993

(22) Filed: Sep. 3, 2015

(65) Prior Publication Data

US 2016/0054008 A1    Feb. 25, 2016

Related U.S. Application Data

(62) Division of application No. 13/241,559, filed on Sep. 23, 2011, now Pat. No. 9,151,506.

(30) Foreign Application Priority Data

Oct. 15, 2010   (CN) .......................... 2010 1 0509411

(51) Int. Cl.
*F24D 17/00* (2006.01)
*F24D 12/02* (2006.01)
(Continued)

(52) U.S. Cl.
CPC ......... *F24D 17/0036* (2013.01); *F24D 12/02* (2013.01); *F24D 17/0068* (2013.01);
(Continued)

(58) Field of Classification Search
CPC .. F24D 12/02; F24D 19/1024; F24D 2200/04; F24D 2200/08
(Continued)

(56) References Cited

U.S. PATENT DOCUMENTS

| 1,945,204 | A | 1/1934 | Sim |
| 4,825,908 | A | 5/1989 | Tsuchihashi et al. |

(Continued)

FOREIGN PATENT DOCUMENTS

| CN | 2800161 | 7/2006 |
| EP | 1895241 A2 | 3/2008 |

*Primary Examiner* — Steven B McAllister
*Assistant Examiner* — Ko-Wei Lin
(74) *Attorney, Agent, or Firm* — Michael Best & Friedrich LLP (57) ABSTRACT

A water heating system includes a first water heater having a first heating source of a first type, and a second water heater having a second heating source of a second type. The system further includes a valve having a first interface connected to the cold water source, a second interface connected to the first cold water inlet of the first water heater, a third interface connected to a second hot water outlet of the second water heater, and a fourth interface connected to the first hot water outlet of the first water heater. A motor positions the valve to one of at least three positions Finally, the system also includes a control circuit including a temperature sensor near the first hot water outlet of the first water heater, and a controller configured to control the motor based on a sensed temperature by the temperature sensor.

8 Claims, 7 Drawing Sheets

(51) Int. Cl.
    *F24D 19/10*     (2006.01)
    *F24H 1/18*     (2006.01)
    *F24H 9/20*     (2006.01)

(52) U.S. Cl.
    CPC ..... *F24D 19/1024* (2013.01); *F24D 19/1051* (2013.01); *F24H 1/185* (2013.01); *F24H 9/20* (2013.01); *F24D 2200/04* (2013.01); *F24D 2200/08* (2013.01); *F24D 2200/14* (2013.01); *Y02B 10/20* (2013.01); *Y02B 10/70* (2013.01); *Y02B 30/14* (2013.01)

(58) Field of Classification Search
    USPC .......................... 137/625.46; 236/20 R, 25 R
    See application file for complete search history.

(56)                  References Cited

U.S. PATENT DOCUMENTS

| | | |
|---|---|---|
| 2012/0037095 A1 | 2/2012 | DuPlessis |
| 2012/0291460 A1 | 11/2012 | Aoyagi |

WATER HEATER HAVING A WATERWAY CHANGEOVER CONTROL APPARATUS AND METHOD FOR OPERATING THE SAME

CROSS-REFERENCE TO RELATED APPLICATIONS

This application is a division of U.S. patent application Ser. No. 13/241,559, filed on Sep. 23, 2011, which claims priority to and the benefit of Chinese Patent Application No. 201010509411.5, filed Oct. 15, 2010, the entire contents of both of which are incorporated herein by reference.

BACKGROUND

The invention relates to a water heater having a waterway changeover control apparatus and its related control method.

Storage electric water heaters, gas water heaters, and solar water heaters are example water heaters with their own advantages respectively. Among them, the electric water heater, installed in the wall cabinet or balcony, includes features of long service life, energy efficiency, safety, and environmental protection. However, it needs preheating prior to use and its continuous water supply typically cannot exceed its volume (i.e., the water temperature will drop after large amounts of water is used). The instantaneous gas water heater can supply hot water while the gas is burning, so that there is no limit on the hot water supply quantity. But due to the drainage of cold water in the pipe after startup, one needs to wait to use, and if one switches off the hot water during use, then the water temperature may be a little bit high after restart. The solar water heater can heat up the water by the sun, which is energy-saving, environmentally beneficial, and economic. However, the solar water heater has shortcomings such as complicated installation, inconvenient maintenance, long cold water pipe, and possible failure in cloudy or rainy days or in winter.

Although there are technical plans to join the electric water heater and the gas or solar water heater, two water heaters need switching independently, which is not only inconvenient, but also fail to make the best use of both water heaters. The patent of China No. 200520004940.4, has introduced an electric water heater that can be used jointly with solar energy. The solar water heater is connected to the electric water heater by a signal line. Below the electric water heater, there is a pipe to connect it to a mixing valve, and then valves to connect the electric water heater and the solar water heater. This connection method is not only complicated, but makes many changes to the original pipes of the user and has poor applicability.

SUMMARY

In one embodiment, the invention presents a waterway changeover control apparatus for a water heater, so that two types of water heaters, for example the electric water heater and the gas or solar water heater, can have a basis to work together. This allows the resultant water heater to adopt the advantages and avoid shortcomings of both water heaters, as well as to give full play to their advantages.

In another embodiment, the invention provides a water heating system that includes a first water heater and a second water heater. The first water heater has a first heating source of a first type, a first cold water inlet, and a first hot water outlet. The second water heater has a second heating source of a second type, a second cold water inlet connected to a cold water source, and a second hot water outlet. The water heating system also includes a valve, a motor, and a control circuit. The valve has a first interface connected to the cold water source, a second interface connected to the first cold water inlet of the first water heater, a third interface connected to the second hot water outlet of the second water heater, and a fourth interface connected to the first hot water outlet of the first water heater. The motor positions the valve to one of at least three positions including a first position defined by the first interface being interconnected to the second interface, a second position defined by the second interface being interconnected to the third interface, and a third position defined by the third interface being interconnected to the fourth interface. Finally, the control circuit includes a temperature sensor near the first hot water outlet of the first water heater, and a controller coupled to the first temperature sensor and the motor. The controller is configured to control the motor based on a sensed temperature by the temperature sensor.

In a more specific embodiment of the invention, the waterway changeover control apparatus includes a changeover valve that is under the control of a control circuit. The changeover valve has a first interface to connect the cold water source, a second interface to connect the cold water inlet of the first water heater, a third interface to connect the hot water outlet of the second water heater, and a fourth interface to connect the hot water outlet of the first water heater, as well as at least three switching positions. When the changeover valve is in the first position, only the first interface is interconnected to the second interface. When the changeover valve is in the second position, only the second interface is interconnected to the third interface. When the changeover valve is in the third position, only the third interface is interconnected to the fourth interface. The control circuit can include an MCU and a first temperature sensor at the hot water outlet of the first water heater. The outlet terminal of the first temperature sensor is connected to a corresponding signal input terminal of the MCU, and the output terminal of the MCU to the control terminal of the changeover valve.

A more specific construction of the water heater can be the changeover valve having a fourth position, and when it is in the fourth position, the third interface is interconnected to the second and fourth interfaces at the same time.

The control circuit of the waterway changeover control apparatus can be installed on the changeover valve or in the water heater, or installed alone. The connections at the input and output terminals of the MCU include a wired connection and a wireless communication connection through a wireless transceiver.

With the help of this invention, two types of water heaters can be conveniently combined together, and by means of control circuit, the automatic switching necessary between two water heaters can be realized.

For example, when an electric water heater is combined with a gas water heater, if the water temperature in the electric water heater is higher, the changeover valve is located in the first position, the cold water source is connected to the water storage tank of the electric water heater, and the electric water heater works alone. When the heating capacity of the electric water heater is insufficient and fails to ensure hot water supply, the changeover valve is switched to the second position. The hot water outlet of the gas water heater is connected to the water storage tank of the electric water heater, so that the cold water in the outlet pipe of the gas water heater flows to the water storage tank of the electric water heater, and then, the changeover valve is switched to the third position. When the changeover valve is switched to the third position, the hot water outlet of the gas water heater is connected to the hot water outlet of the electric water heater, so that the gas water heater will supply hot water alone to keep continuous hot water supply.

For another example, when an electric water heater is combined with a solar water heater, the hot water in the solar water heater will be used at first due to the environmental protection and the energy saving characteristics of the solar water heater. At the time, the changeover valve is in the second position, the cold water in the solar water heater is drained into the electric water heater when there is hot water in the electric water heater, and then, the changeover valve is switched to the third position and the solar water heater supplies hot water alone.

If the changeover valve is in the fourth position, the hot water outlet of the gas or solar water heater is connected to both the hot water outlet and water storage tank of the electric water heater. In this way, two water heaters will supply hot water together.

As a result, some embodiments of the invention can not only make the electric water heater or gas water heater to supply hot water alone, but also can realize: 1) a series connection between two water heaters—when the heating capacity of the electric water heater is insufficient, the gas or solar water heater can compensate; 2) a parallel connection between two water heaters—when the hot water supply of the electric water heater is insufficient, the gas or solar water heater can supply hot water. When the changeover valve is in the second position, the outlet of the gas or solar water heater is connected to the water storage tank of the electric water heater, so that the retained cold water in the outlet pipe can be drained into the water storage tank of the electric water heater. Then, the changeover valve is switched to the third position, and the gas or solar water heater supplies hot water alone. At the time, due to the retained cold water draining into the water storage tank of the electric water heater, the problem of cold water drainage of a gas or solar water heater prior to use can be solved, thereby avoiding waste of water.

One exemplary procedure of switching control by the control circuit in the waterway changeover control module for the water heater is as follows:

Step 1: With the changeover valve in its first position, confirm if the water temperature rise (monitored by a first temperature sensor) at the outlet of the first water heater is higher than a preset value. This determines if the user started to use water. If yes, then go to Step 2, otherwise, keep monitoring.

Step 2: Confirm if the water temperature reaches the peak value based on the preset conditions. If yes, then go to Step 3, otherwise, keep monitoring.

Step 3: Confirm if the water temperature drop after reaching the peak value exceeds the allowed threshold value. If yes, then go to Step 4, otherwise, keep monitoring.

Step 4: Switch the changeover valve to its second position and hold it there for a certain time, in order to drain the retained cold water from the pipe into the water storage tank of the first water heater.

Step 5: Switch the changeover valve to the third position, so that only the second water heater supplies water.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Example I

Figure 1:
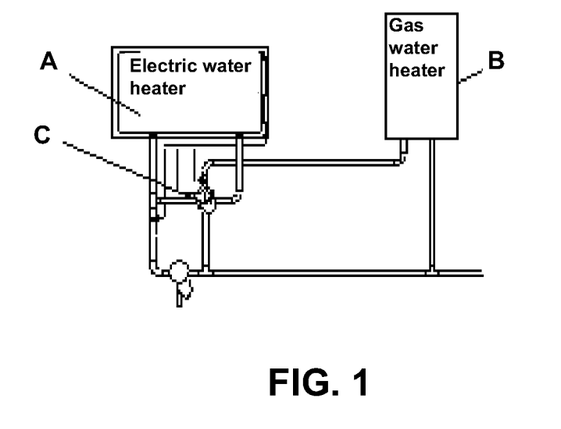
FIG. 1 is a structure diagram of Example I of the invention.
Figure 2:
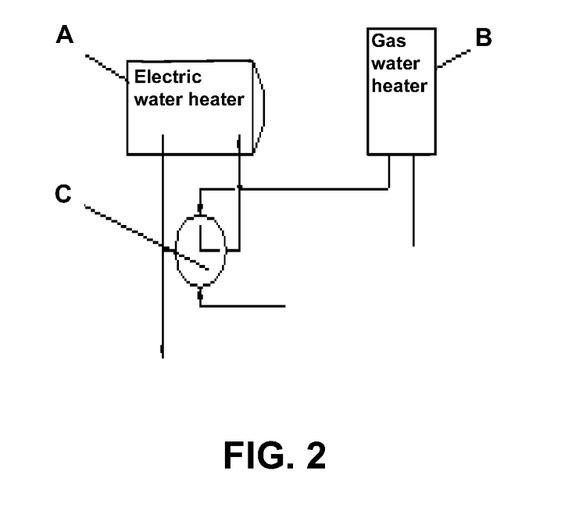
FIG. 2 is a schematic diagram of Example I.
Figure 3A:
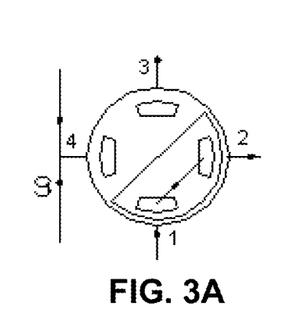
FIGS. 3A-3D are schematic diagrams for the first, second, third, and fourth positions, respectively, of the changeover valve in Example I.
Figure 3B:
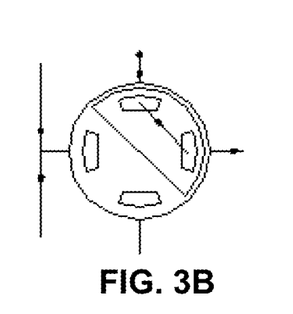
Figure 3C:
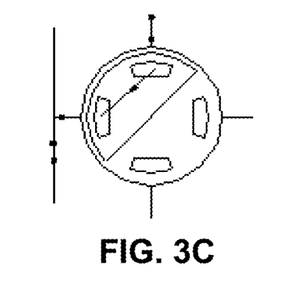
Figure 3D:
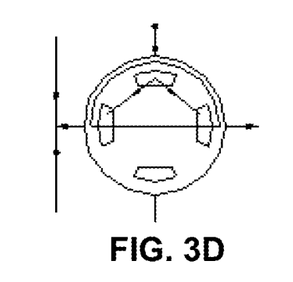

The waterway changeover control apparatus for a water heater 100 (may also be referred to herein as a water heating system 100) is shown in FIGS. 1 and 2. The water heater 100 includes the changeover valve C that is under the control of a control circuit. Reference A is a storage electric water heater, as the first water heater, and reference B is a gas water heater (such as an instantaneous gas water heater), as the second water heater. The valve C, shown in FIG. 3, has four interfaces with an approximately ninety degree interval between each other. The first interface 1 is connected to the cold water source, the second interface 2 is connected to the cold water inlet of the electric water heater A, the third interface 3 is connected to the hot water outlet of the gas water heater B, and the fourth interface 4 is connected to the hot water outlet of the electric water heater A. In addition, the valve C has three main switching positions. When the valve C is in the first position, as shown in FIG. 3 (A), only the first and second interfaces are interconnected; i.e. the cold water source is connected to the water storage tank of the electric water heater A, at the time, the cold water can be filled into the water storage tank. When the valve C is in the second position as shown in FIG. 3 (B), only the second and third interfaces are interconnected; i.e. the hot water outlet of the gas water heater B is connected to the water storage tank of the electric water heater A, at the time, the retained cold water in the pipe can be drained into the water storage tank. When the valve C is in the third position as shown in FIG. 3 (C), only the third and fourth interfaces are interconnected; i.e. the hot water outlet of the gas water heater B is connected to the hot water outlet of the electric water heater A, at the time, the gas water heater B supplies hot water. The valve C has the fourth switching position as shown in FIG. 3 (D), where the third interface 3 is connected to both second interface 2 and fourth interface 4, at the time, the hot water outlet of the gas water heater B is connected to both hot water outlet and water storage tank of the electric water heater A.

Figure 4:
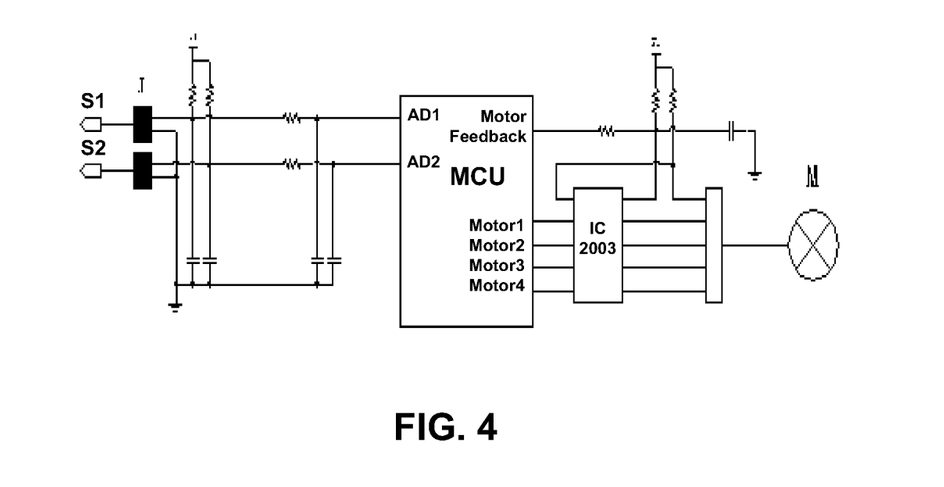
FIG. 4 is a control circuit diagram of Example I.

The control circuit, referring to FIG. 4, includes an MCU and the first temperature sensor S1 near the hot water outlet of the electric water heater A. The output terminal of the first temperature sensor is connected to the corresponding signal inlet terminal AD1 of MCU (e.g., Renesas Electronics America, model no. R5F212K4), and the output terminal of MCU to the valve motor M—the controlled terminal of the valve C through driver IC IC2003 (e.g., Texas Instrument Model No. ULN2003).

After the waterway changeover control apparatus for water heating system 100 in this example starts up, it allows selecting the electric mode or gas mode. If the intelligent mode is selected, the switching control procedures of the control circuit are shown as FIG. 5.

Figure 5:
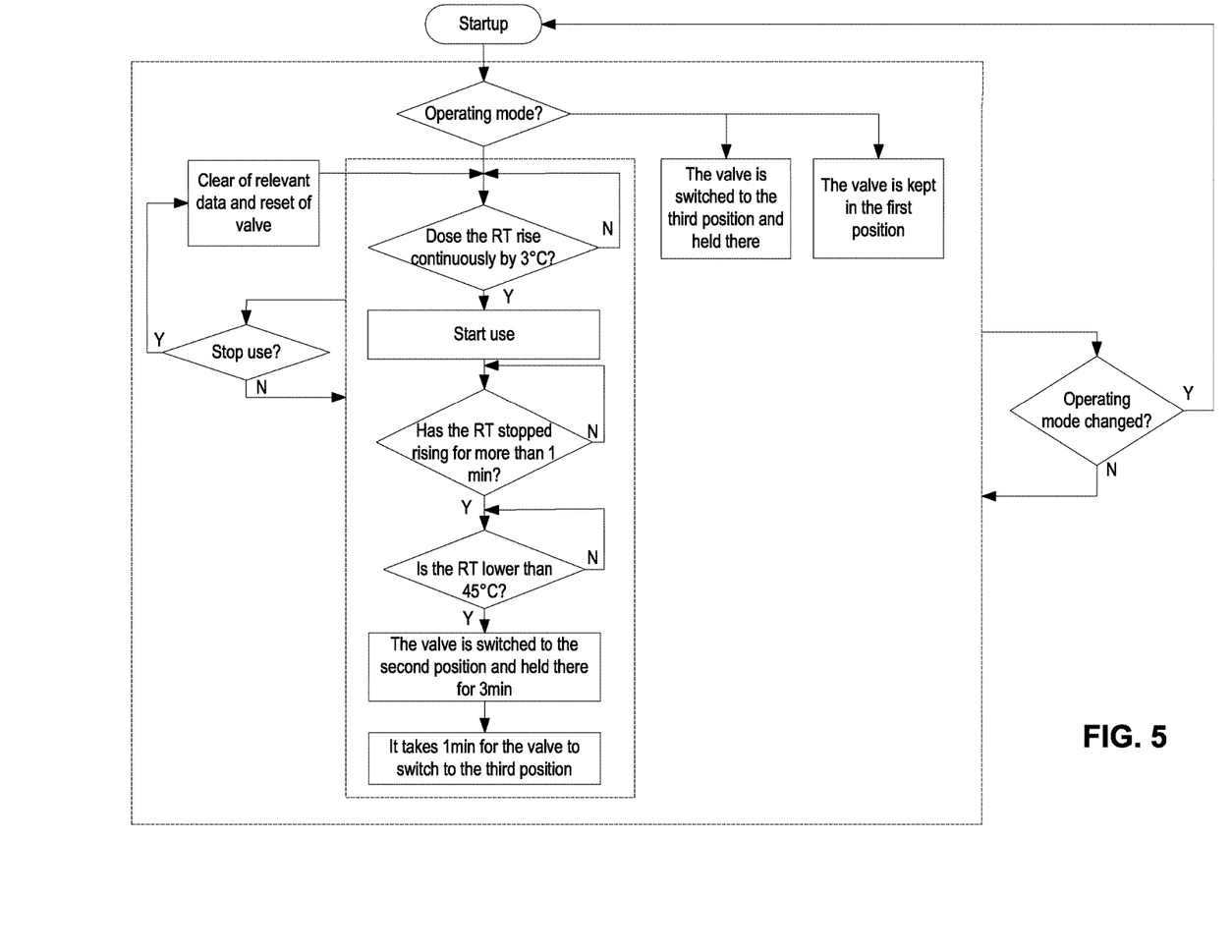
FIG. 5 is a control process block diagram of Example I.

Step 1: At first, with the valve C in its first position, confirm if the water temperature rise RT (monitored by the first temperature sensor) near the outlet of the first water heater A is higher than a set value (e.g., three degrees Celsius), to determine if the user starts to use water. If yes, then go to Step 2, otherwise, keep monitoring.

Step 2: Confirm if RT reaches the peak value based on the preset conditions that the water temperature stops rise for more than a time period (e.g., 1 minute); if yes, then go to Step 3, otherwise, keep monitoring.

Step 3: Confirm if the water temperature RT after reaching the peak value has dropped below a threshold value (e.g., 45 degrees Celsius). If yes, then go to Step 4, otherwise, keep monitoring.

Step 4: The motor M starts and switches the valve C to its second position and keep it there for a time period (e.g., three minutes), in order to drain the retained cold water from the pipe into the water storage tank of the electric water heater A.

Step 5: The motor M starts and switches the valve C to its third position, so that only gas water heater B supplies water, thus to continuously supply hot water. It has been found that example I has at least one or more of the following improvements when compared with the prior water heating systems:

1. When the water supply in the electric water heater A is insufficient, it can switch to the gas water heater B automatically, and the switching process is stable and reliable.

2. The cold water period problem is solved well, because the retained cold water in the pipe of the gas water heater B is drained into the water storage tank of the electric water heater A, instead of supplying to the user directly. When the water from the gas water heater B supplies directly to the user in Step 4 and 5, the cold water has been already drained completely into the water storage tank of the electric water heater A, so that there is only hot water at the water outlet.

3. The changeover operation can make the best use of the electric and gas water heaters A and B, to give full play to their advantages. In normal conditions, the water volume in the electric water heater A is enough for the user to use. However, for winter season or many users, the system can identify automatically if the water volume is sufficient or not, and when insufficient, the system can start up the gas water heater B automatically. The startup and changeover processes are stable, without the problem of a cold water period nor the problem of hot and then cold water supply. If the user would like to use the gas water heater B and meanwhile avoid the problem of the cold water period, the user can start when the water is heated to a set point (e.g., 45 degrees Celsius) by the electric water heater A in the fast mode, so that the waiting time is very short.

4. The retained cold water of the gas water heater B may be drained directly or stored in another container by the user in general, while this example can save water and provide convenience to the user.

5. When the water supply is switched from the electric water heater A to the gas water heater B, the water temperature of the gas water heater B can be sensed intelligently. If the temperature is too high, it will force the water temperature to make a gradual change, to remind the user.

6. Each time after a bath of the user, for example, the water heating system can reset automatically, without any influence to the next use.

Example II

This example is similar to Example I in the basic structure. One difference is, besides the first temperature sensor S1 installed near the hot water outlet of the electric water heater A for measuring $RT_{electric}$, there is the second temperature sensor installed near the outlet of the gas water heater B for measuring $RT_{gas}$.

Figure 6:
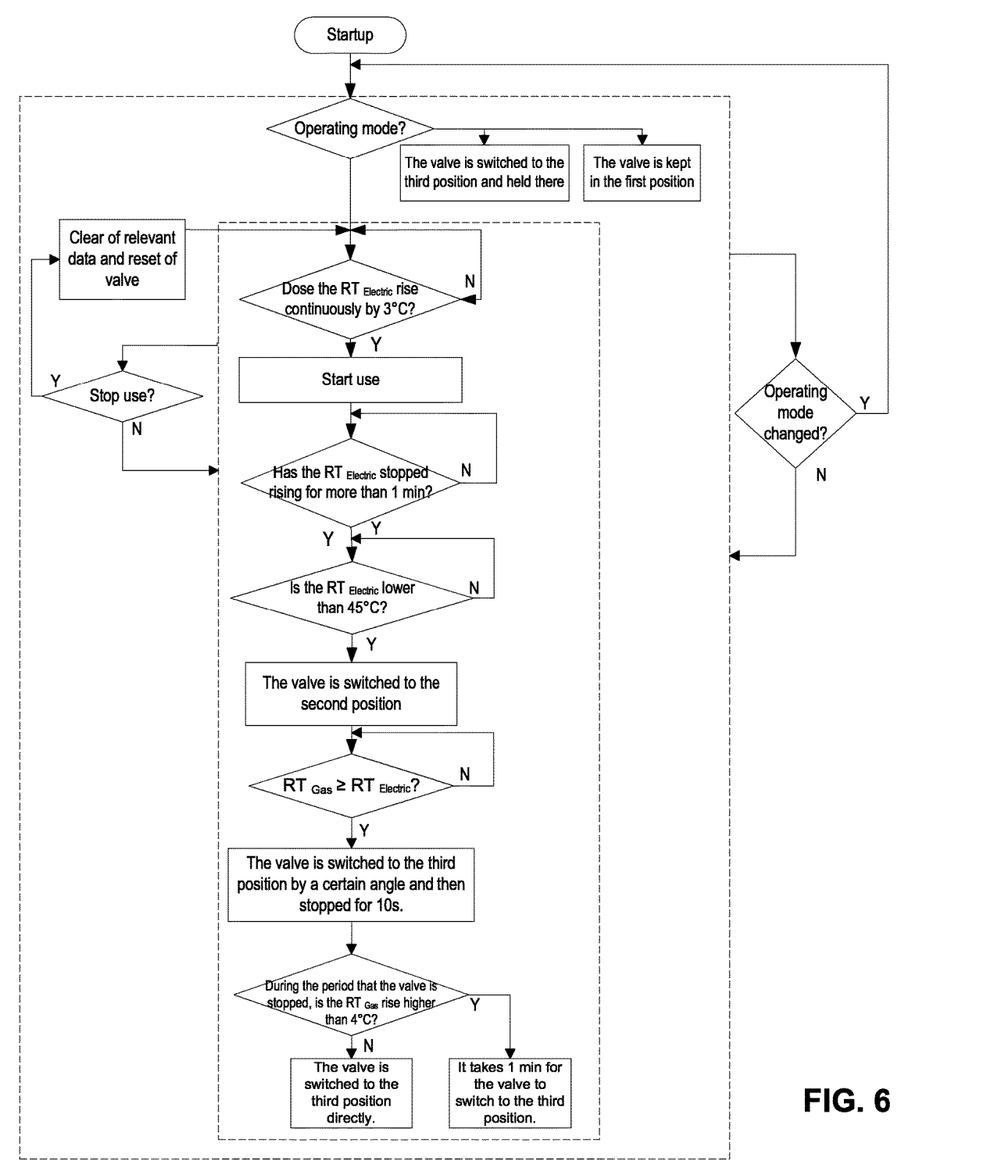
FIG. 6 is a control process block diagram of Example II of the invention.

The control process is shown in FIG. 6. After startup, the MCU starts the rotation of the motor M for valve C at first, to prevent it from adhesion, and then, confirm if the intelligent mode that combines the electric and gas water heaters A and B is selected. If yes, then the waterway changeover control apparatus for water heating system 100 will be controlled as follows:

Step 1: With the valve C in its first position, confirm if the water temperature $RT_{electric}$ (measured by the first temperature sensor) rises continuously by a preset value (e.g., three degrees Celsius), to determine if the user starts to use water.

Step 2: Confirm if $RT_{electric}$ reaches the peak value based on the preset conditions that the water temperature stops rise for more than 1 min. If yes, then go to Step 3, otherwise, keep monitoring.

Step 3: Confirm if the water temperature $RT_{electric}$ after reaching the peak value has dropped below a threshold value (e.g., 45 degrees Celsius). If yes, then go to Step 4, otherwise, keep monitoring.

Step 4: The motor M switches the valve C to its second position and the controller confirms if the water temperature $RT_{gas}$ measured by the second temperature sensor S2 is higher than $RT_{electric}$ measured by the first temperature sensor. If no, then keep monitoring. If yes, then turn the valve C to its third position by a preset angle (e.g., thirty degrees) and after the preset time interval (e.g., ten seconds), measure the temperature rise of $RT_{gas}$, to avoid the water temperature from being too high.

Step 5: Confirm if the $RT_{gas}$ rise exceeds the allowed threshold value (e.g., four degrees Celsius) within the preset time interval. If yes, then the motor M switches the valve C to its third position after the preset time (e.g., one minute). Otherwise, it will put the valve C to its third position directly. Finally, only gas water heater B supplies water; i.e. to continuously supply hot water. In this way, any overheating of the water due to fast temperature rise can be avoided.

In the above-mentioned process, the valve C has the fourth position, where the third interface is connected to both the second and fourth interfaces. The hot water outlet of the gas water heater B is connected to both the hot water outlet and water storage tank of the electric water heater A, so that the gas and electric water heaters A and B will work together to provide sufficient hot water. If the operation is stopped or the combination is canceled according to detection, the clear operation is carried out to reset the valve C.

Example III

Figure 7:
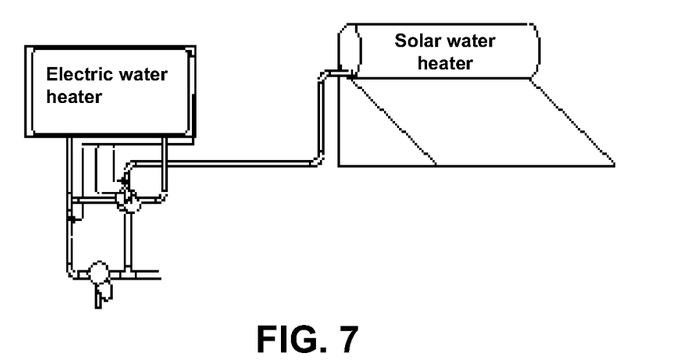
FIG. 7 is a structure diagram of Example III of the invention.
Figure 8:
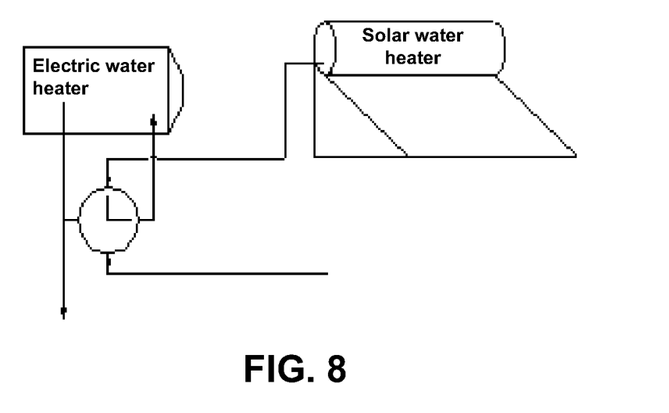
FIG. 8 is a schematic diagram of Example III.

The waterway changeover control apparatus for water heating system 100 of this example is shown in FIGS. 7 and 8. One difference with Example III is that the second water heater is a solar water heater D. The connections of the valve C can refer to Example I. Refer to FIG. 4 for control circuit.

The first temperature sensor S1 and the second one S2 are installed near the hot water outlet of the electric and solar water heaters A and D, respectively.

Figure 9:
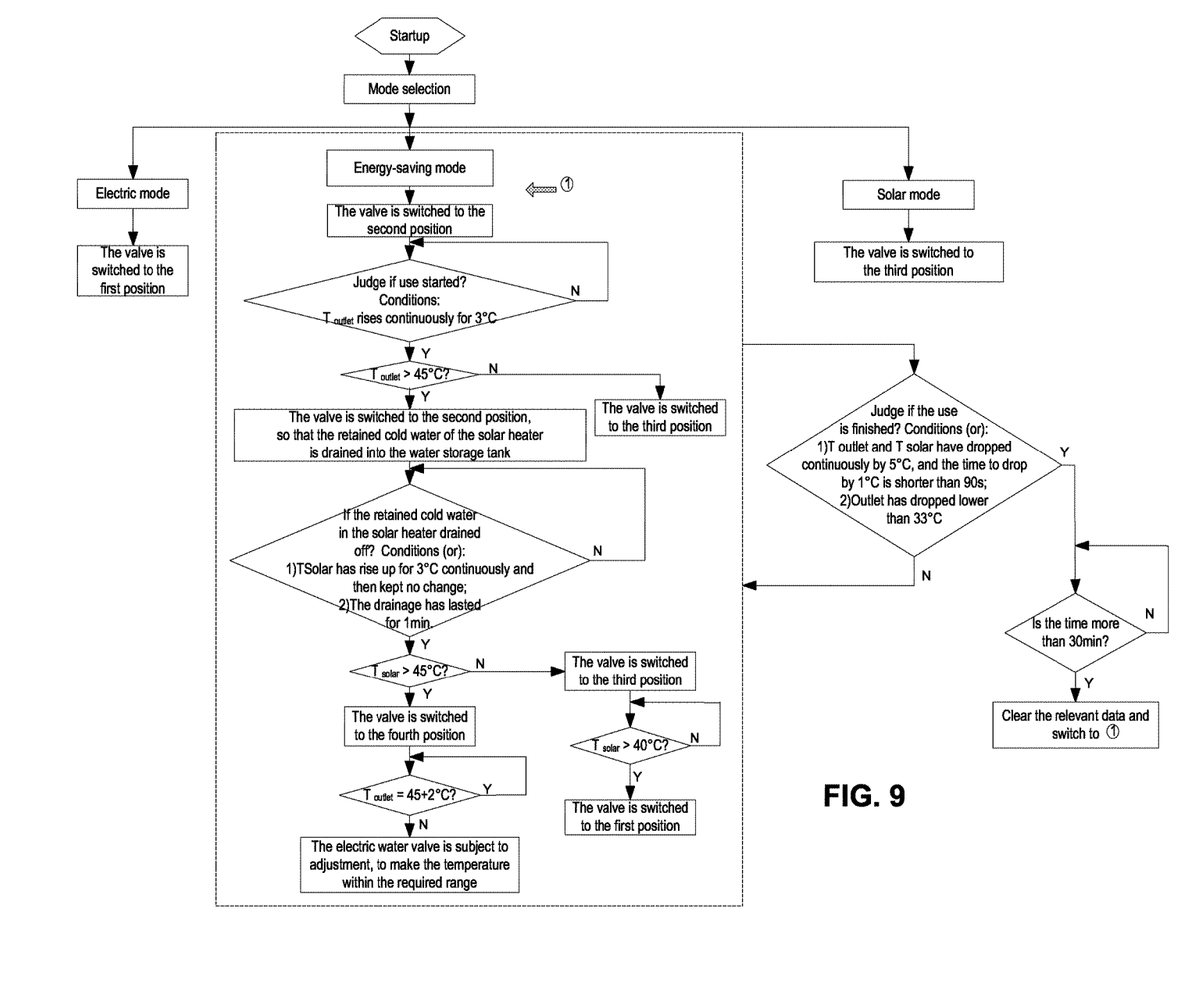
FIG. 9 is a control process block diagram of Example III.

After startup, when the energy efficiency mode is selected, the switching control procedures of the control circuit are shown in FIG. 9, as follows:

Step 1: With the valve C in its second position, confirm if the water temperature rise $T_{outlet}$ (monitored by the first temperature sensor) of the first water heater A is higher than a preset value (e.g., three degrees Celsius), to determine if the user starts to use water. If yes, then go to Step 2, otherwise, keep monitoring.

Step 2: Confirm if the water temperature $T_{outlet}$ (measured by the first temperature sensor) of the electric water heater A is higher than the a preset value (e.g., 45 degrees Celsius). If no, then the motor M starts and switches the valve C to its third position and makes the solar water heater D supply hot water. If yes, then go to Step 3.

Step 3: The motor M starts and switches the valve C to its second position, which drains the retained cold water from the outlet pipe of the solar water heater D into the water storage tank of the electric water heater A. The step confirms if the cold water is drained out completely based on the preset conditions. In one example, the conditions are: the temperature T in the outlet pipe of the solar water heater D rises up continuously (e.g., by three degrees Celsius) and keeps at the temperature for more than a time period (e.g., one minute), or drains the water continuously for more than a time period (e.g., one period). If no, then keep monitoring. If yes, then go to Step 4.

Step 4: Confirm if the water temperature $T_{solar}$ (measured by the second temperature sensor) of the solar water heater D is lower than a preset value (e.g., 45 degrees Celsius). If no, then the motor M starts and switches the valve C to its third position and makes the solar water heater D supply hot water until the water temperature drops lower than a preset threshold (forty degrees Celsius). At this time, switch the valve C to its first position and have the electric water heater A supply hot water. If yes, then go to Step 5.

Step 5: The motor M starts and switches the valve C to its fourth position, so that the solar water heater D and electric water heater A supply water jointly.

After this, the water temperature $T_{outlet}$ is monitored to confirm if it is within a range (e.g., 43-47 degrees Celsius). If no, then make the system 100 the requirement by further regulation.

Therefore, the hot water in the solar water heater D will be used to the greatest extent by the user while the hot water of the electric water heater A is only supplied as compensation, thereby saving energy.

Besides the above-mentioned examples, the invention has other applicable methods. For example, a temperature sensor can be installed at the water storage tank and the water outlet of the electric water heater A as well as the water outlet of the gas water heater B respectively. Their output terminals are connected to the corresponding signal input terminals of the control circuit (including the MCU). The sensors output $T_{tank}$—temperature of the probe on the top of the water storage tank, $T_{water}$—outlet water temperature of the electric water heater A, and $T_{gas}$—outlet water temperature of the gas water heater B. Therefore, a more precise control can be realized. Any technical proposal resulting from equivalent replacement or equivalent transformation falls into the protective range of this invention.

Thus, the invention provides, among other things, a new and useful water heater having a water changeover control apparatus and method for operating the same. Various features and advantages of the invention are set forth in the following claims.

What is claimed is:

1. A water heating system comprising:
   a first water heater having
      a first heating source of a first type,
      a first cold water inlet, and
      a first hot water outlet;
   a second water heater having
      a second heating source of a second type,
      a second cold water inlet connected to a cold water source, and
      a second hot water outlet;
   a valve having
      a first interface connected to the cold water source,
      a second interface connected to the first cold water inlet of the first water heater,
      a third interface connected to the second hot water outlet of the second water heater, and
      a fourth interface connected to the first hot water outlet of the first water heater,
   the valve movable between at least three positions;
   a motor positioning the valve to one of the at least three positions including
      a first position defined by the first interface being interconnected to the second interface,
      a second position defined by the second interface being interconnected to the third interface, and
      a third position defined by the third interface being interconnected to the fourth interface; and
   a control circuit including
      a temperature sensor near the first hot water outlet of the first water heater, and
      a controller coupled to the first temperature sensor and the motor, the controller configured to control the motor based on a sensed temperature by the temperature sensor.

2. The water heating system of claim 1, wherein the motor further positions the valve to a fourth position defined by the third interface being interconnected to the second and fourth interfaces concurrently.

3. The water heating system of claim 1, wherein the second type is different from the first type.

4. The water heating system of claim 1, wherein the first heating source of the first type includes an electric heating source and the second heating source of the second type includes a gas heating source, and the first water heater is a storage water heater and the second water heater is an instantaneous water heater.

5. The water heating system of claim 1, wherein the first heating source of the first type includes an electric heating source and the second heating source of the second type includes a solar heating source.

6. The water heating system of claim 5, wherein the control circuit further includes a second temperature sensor near the second hot water outlet of the second water heater, and the controller is further configured to control the motor based on a second sensed temperature by the second temperature sensor.

7. The water heating system of claim 1, wherein the control circuit further includes a second temperature sensor near the second hot water outlet of the second water heater, and the controller is further configured to control the motor based on a second sensed temperature by the second temperature sensor.

8. The water heating system of claim 1, wherein the first water heater includes a storage tank, the control circuit further includes a second temperature sensor near the second hot water outlet of the second water heater and a third temperature sensor near the storage tank, and the controller is further configured to control the motor based on a second sensed temperature by the second temperature sensor and a third sensed temperature by the third temperature sensor.

* * * * *